(12) United States Patent
Park et al.

(10) Patent No.: US 12,489,381 B2
(45) Date of Patent: Dec. 2, 2025

(54) SYSTEM AND METHOD OF CONTROLLING POSITION OF MOTOR

(71) Applicant: SAMSUNG DISPLAY CO., LTD., Yongin-si (KR)

(72) Inventors: Sungjoon Park, Yongin-si (KR); Sungshin Kwak, Yongin-si (KR); Minkyu Kim, Yongin-si (KR); Hongju Mun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 404 days.

(21) Appl. No.: 18/139,676

(22) Filed: Apr. 26, 2023

(65) Prior Publication Data

US 2023/0344371 A1    Oct. 26, 2023

(30) Foreign Application Priority Data

Apr. 26, 2022    (KR) ........................ 10-2022-0051654

(51) Int. Cl.
*H02P 5/00*    (2016.01)
*G05B 19/4155*    (2006.01)

(52) U.S. Cl.
CPC ............ *H02P 5/00* (2013.01); *G05B 19/4155* (2013.01); *G05B 2219/43196* (2013.01)

(58) Field of Classification Search
CPC .................. H02P 5/00; G05B 19/4155; G05B 2219/43196
See application file for complete search history.

(56) References Cited

U.S. PATENT DOCUMENTS

| | | | | |
|---|---|---|---|---|
| 4,469,993 A | * | 9/1984 | Swanson ................ | G05B 19/39 198/810.01 |
| 4,617,502 A | * | 10/1986 | Sakaue .................. | G05B 19/42 318/636 |
| 5,736,824 A | * | 4/1998 | Sato ..................... | G05B 19/416 318/560 |
| 6,571,138 B1 | | 5/2003 | Okada et al. | |
| 6,697,683 B1 | * | 2/2004 | Tisue ................... | G02B 26/105 700/62 |
| 7,009,357 B2 | * | 3/2006 | Mizuno ................ | G05B 19/414 700/83 |
| 10,974,393 B2 | | 4/2021 | Yoshiura et al. | |

FOREIGN PATENT DOCUMENTS

| | | |
|---|---|---|
| KR | 100339468 B1 | 6/2002 |
| KR | 20050060391 A | 6/2005 |
| KR | 102226986 B1 | 3/2021 |

* cited by examiner

*Primary Examiner* — Thai T Dinh
(74) *Attorney, Agent, or Firm* — CANTOR COLBURN LLP

(57) ABSTRACT

A motor position control system includes a central server including first information of a first display device and second information of a second display device, and a motor position control device which controls positions of the plurality of motors, where the motor position control device includes a controller which receives the first and the second information from the central server and store the first and the second information in a memory, controls the positions of the plurality of motors based on the first information, calculates at least one value based on the first and the second information, selects at least some motors based on the at least one value, and controls positions of the at least some motors based on the at least one value.

20 Claims, 11 Drawing Sheets

FIG. 4

|  | SOURCE TABLE | | | | | | 211t / cl |
|---|---|---|---|---|---|---|---|
| formula 01 | #2 | − | #1 | = |  |  | source 01 |
| formula 02 | source 01 | + | #4 | − | #3 | = | source 02 |
| formula 03 | source 02 | − | source 01 | + | #5 | = | source 03 |
|  | ⋮ | | | | | | |

FIG. 6

| JOB TABLE | |
|---|---|
| M1 | source table, source 01 |
| M2 | source table, source 02 |
| M3 | source table, source 03 |
| ⋮ | |

213t

SYSTEM AND METHOD OF CONTROLLING POSITION OF MOTOR

This application claims priority to Korean Patent Application No. 10-2022-0051654, filed on Apr. 26, 2022, and all the benefits accruing therefrom under 35 U.S.C. § 119, the content of which in its entirety is herein incorporated by reference.

BACKGROUND

1. Field

The disclosure relates to a motor position control system and a motor position control method.

2. Description of the Related Art

Display devices display data visually. Display devices are used as a display of compact products, such as mobile phones, or a display of large-sized products, such as televisions.

The display devices are recently used in various fields. Also, as display devices become thin and lightweight, the range of usage thereof is widening. Thus, various attempts are being made in the research into facilitating the manufacture of display devices. For example, various attempts are being made in the research into reducing the setting time of equipment for manufacturing a display device.

SUMMARY

One or more embodiments provide a motor position control system and a motor position control method for reducing the setting time of equipment for manufacturing a display device.

The technical objectives to be achieved by the disclosure are not limited to those described above, and other technical objectives not mentioned herein will be clearly understood by those of ordinary skill in the art from the description of the disclosure.

According to one or more embodiments, a motor position control system for a plurality of motors used to sequentially manufacture a first display device and a second display device, includes: a central server including first information of the first display device and second information of the second display device; and a motor position control device which controls positions of the plurality of motors, where the motor position control device includes: a memory; and a controller which receives the first information and the second information from the central server and store the first information and the second information in the memory, controls the positions of the plurality of motors based on the first information, calculates at least one value based on the first information and the second information, selects at least some motors from among the plurality of motors based on the at least one value, and controls positions of the at least some motors based on the at least one value.

According to an embodiment, the controller may include a source table driver which generates at least one calculation value based on the first information and the second information using a source table, a job table driver which generates control values respectively corresponding to the at least some motors based on the at least one calculation value using a job table, and a data manager which transmits the first information and the second information to the source table driver, and transmits the at least one calculation value to the job table driver.

According to an embodiment, the source table may include a spreadsheet which receives, in a plurality of cells therein, the first information and the second information as an input and generates the at least one calculation value.

According to an embodiment, the source table may store at least one preset formula which uses the first information and the second information as variables, and the at least one calculation value may be calculated based on the at least one preset formula.

According to an embodiment, the at least one calculation value may be in plurality, and the job table driver may generate control values respectively corresponding to the plurality of motors using the job table which refers to a plurality of calculation values calculated from the source table, and the controller may select the at least some motors having a corresponding control value which is not 0 from among the plurality of motors.

According to an embodiment, the controller may control a position of a rotor of the at least some motors in a way such that a device connected to the at least some motors is moved from an initial position based on the at least one value.

According to an embodiment, the controller may control a position of a rotor of the at least some motors based on the at least one value in a way such that a device connected to the at least some motors is moved.

According to an embodiment, the controller may determine whether a position of an alignment mark of a sample substrate on a worktable, which is measured using an imaging device connected to the at least some motors, is within an error range of a preset alignment position, and recalculate, when the position of the alignment mark of the sample substrate is outside the error range of the preset alignment position, at least one value based on the first information and the second information.

According to an embodiment, the controller may determine whether a position of a sample window attached to a sample substrate on a worktable, using a roller connected to the at least some motors, is within an error range of a preset attachment position, and recalculates, when the position of the sample window is outside the error range of the preset attachment position, at least one value based on the first information and the second information.

According to an embodiment, the first information may include information about a first display panel, a first window, and a first driver integrated circuit (IC), which constitute the first display device, and the second information may include information about a second display panel, a second window, and a second driver IC, which constitute the second display device.

According to one or more embodiments, a motor position control method for a plurality of motors used to sequentially manufacture a first display device and a second display device, includes controlling positions of the plurality of motors based on first information of the first display device, receiving second information of the second display device, calculating at least one value based on the first information and the second information, selecting at least some motors from among the plurality of motors based on the at least one value, and controlling positions of the at least some motors based on the at least one value.

According to an embodiment, the calculating of the at least one value may include calculating the at least one value by inputting the first information and the second information into a plurality of cells constituting a spreadsheet.

According to an embodiment, the calculating of the at least one value may include calculating the at least one value based on at least one preset formula which uses the first information and the second information as variables.

According to an embodiment, the at least one preset formula may be stored in a spreadsheet.

According to an embodiment, the at least one value may be in plurality, and the selecting the at least some motors may include generating control values respectively corresponding to the plurality of motors by referring to a plurality of calculated values, and selecting the at least some motors having a corresponding control value which is not 0 from among the plurality of motors.

According to an embodiment, the controlling the positions of the at least some motors may include controlling a position of a rotor of the at least some motors om a way such that a device connected to the at least some motors is moved from an initial position based on the at least one value.

According to an embodiment, the controlling the positions of the at least some motors may include controlling a position of a rotor of the at least some motors based on the at least one value in a way such that a device connected to the at least some motors is moved.

According to an embodiment, the motor position control method may further include determining whether a position of an alignment mark of a sample substrate on a worktable, which is measured using an imaging device connected to the at least some motors, is within an error range of a preset alignment position, and recalculating at least one value based on the first information and the second information when the position of the alignment mark of the sample substrate is outside the error range of the preset alignment position.

According to an embodiment, the motor position control method may further include determining whether a position of a sample window attached to a sample substrate on a worktable, using a roller connected to the at least some motors, is within an error range of a preset attachment position, and recalculating at least one value based on the first information and the second information when the position of the sample window is outside the error range of the preset attachment position.

According to an embodiment, the first information may include information about a first display panel, a first window, and a first driver IC, which constitute the first display device, and the second information may include information about a second display panel, a second window, and a second driver IC, which constitute the second display device.

Embodiments described herein may be implemented using a system, a method, a computer program, or a combination of the system, the method, and the computer program.

BRIEF DESCRIPTION OF THE DRAWINGS

The above and other features of certain embodiments of the disclosure will be more apparent from the following description taken in conjunction with the accompanying drawings, in which:

FIG. 4 schematically illustrates a source table according to an embodiment;

FIG. 6 schematically illustrates a job table according to an embodiment;

DETAILED DESCRIPTION

Figure 1:
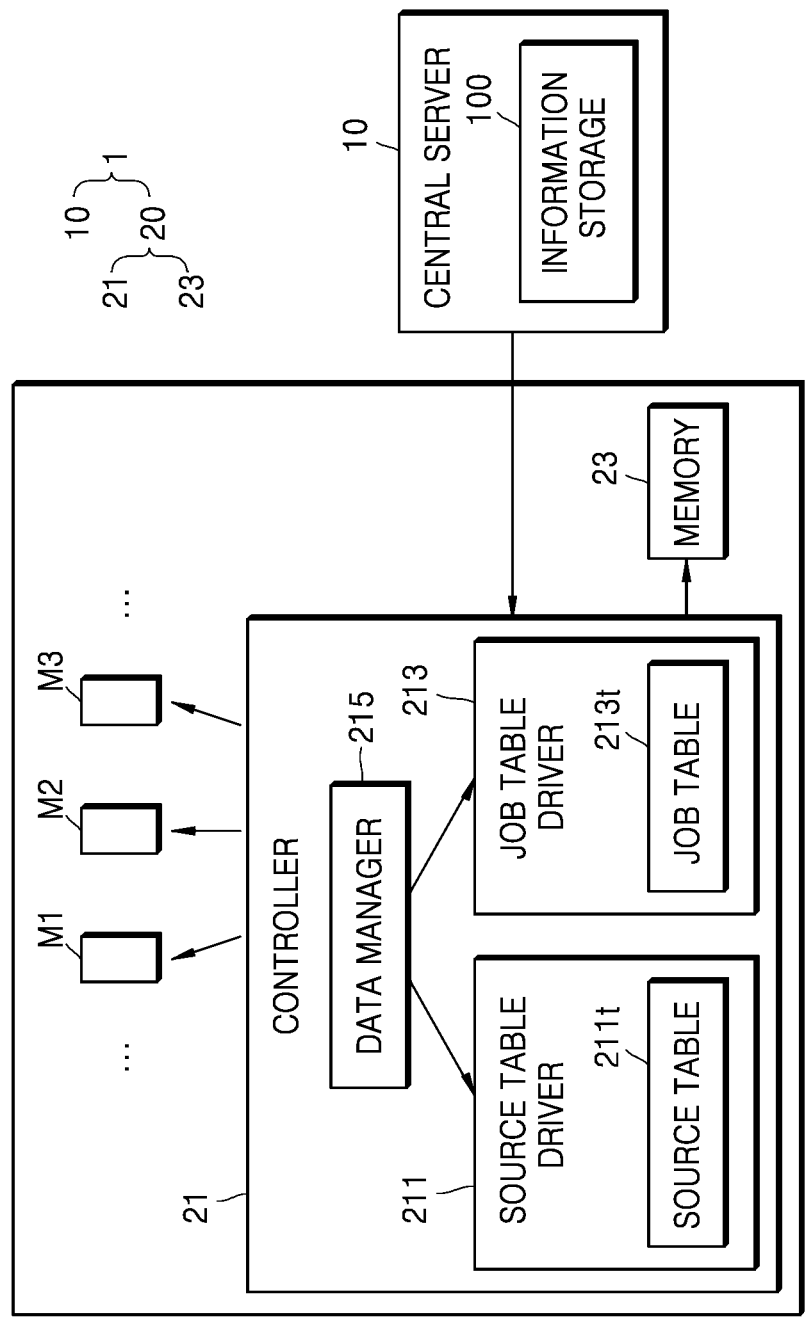
FIG. 1 is a schematic view of a motor position control system according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. As used herein, the term "and/or" includes any and all combinations of one or more of the associated listed items. Throughout the disclosure, the expression "at least one of a, b and c" or "at least one selected from a, b and c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. The effects and features of the disclosure, and ways to achieve them will become apparent by referring to embodiments that will be described later in detail with reference to the drawings. However, the disclosure is not limited to the following embodiments but may be embodied in various forms.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an.".

It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

In the embodiments below, it will be understood when a portion such as a layer, an area, or an element is referred to as being "on" or "above" another portion, it can be directly on or above the other portion, or intervening portion may also be present.

Also, in the drawings, for convenience of description, sizes of elements may be exaggerated or contracted. For example, since sizes and thicknesses of elements in the drawings are arbitrarily illustrated for convenience of explanation, the following embodiments are not limited thereto.

When an embodiment is implementable in another manner, a predetermined process order may be different from a described one. For example, two processes that are consecutively described may be substantially simultaneously performed or may be performed in an opposite order to the described order.

"Or" means "and/or." As used herein, the term "and/or" includes any and all combinations of one or more of the associated listed items. Throughout the disclosure, "A and/or B" indicates A, B, or both A and B. Also, "at least one of A and B" or "at least one selected from A and B" indicates A, B, or both A and B.

In the embodiments below, it will also be understood that when a layer, an area, or an element, or the like is referred to as being "connected to" another one, it can be directly connected to the other one, or/and it can be electrically connected to the other one and other intervening layers, areas, or elements may be present. For example, in the disclosure, when a layer, an area, or an element, or the like is referred to as being "electrically connected to" another one, it can be directly electrically connected to the other one, or/and it can be electrically connected to the other one and other intervening layers, areas, or elements may be present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An x-axis, a y-axis, and a z-axis are not limited to three axes on a rectangular coordinates system but may be construed as including these axes. For example, an x-axis, a y-axis, and a z-axis may be at right angles or may also indicate different directions from one another, which are not at right angles.

Hereinafter, embodiments of the disclosure will be described in detail with reference to the accompanying drawings, and in the description with reference to the drawings, like reference numerals refer to like elements and redundant descriptions thereof will be omitted.

FIG. 1 is a schematic view of a motor position control system according to an embodiment.

Referring to FIG. 1, an embodiment of a motor position control system 1 may include a central server 10 and a motor position control device 20.

The central server 10 may include a control system for monitoring and managing at least some motors M1, M2, and M3 used in a factory and/or the motor position control device 20. The central server 10 may wirelessly communicate with the at least some motors M1, M2, and M3 and/or the motor position control device 20. The central server 10 may wirelessly communicate with the at least some motors M1, M2, and M3 and/or the motor position control device 20 using various wireless communication technologies, such as wireless local area network (LAN) (Wireless Fidelity (WiFi)), single-hop, multi-hop, and Bluetooth. Although not illustrated in FIG. 1, the motor position control system 1 may include a radio repeater that relays wireless communication between the central server 10 and the motors M1, M2, M3 and/or the motor position control device 20. The radio repeater may form a wireless communication network, and may be configured with various wireless communication technologies, such as wireless LAN, single-hop, multi-hop, and Bluetooth.

The central server 10 may include an information storage 100. The information storage 100 may include information about a display device to be manufactured by a device connected to the at least some motors M1, M2, and M3. In an embodiment, for example, the information about a display device may include information about a display panel, a window, and a driver integrated circuit (IC) constituting the display device. The information about a display device may include the length, width, and thickness of each of the display panel and the window, a position of an alignment mark, a position of the driver IC, and the like. This will be described in detail with reference to FIG. 3.

The motor position control device 20 may control positions of the motors M1, M2, and M3. The motor position control device 20 may wirelessly communicate with the motors M1, M2, and M3. Although not illustrated in FIG. 1, as described above, the motor position control system 1 may include a radio repeater that relays wireless communication between the motor position control device 20 and the motors M1, M2, and M3.

The motor position control device 20 may include a controller 21 and a memory 23. The controller 21 may receive information (e.g., the information about a display device described above) from the central server 10 and store the information in the memory 23. The controller 21 may control the positions of the motors M1, M2, and M3 based on the information.

The controller 21 may include a source table driver 211 that uses (or operates based on) a source table 211$t$, a job table driver 213 that uses a job table 213$t$, and a data manager 215. As will be described in detail with reference to FIGS. 4 and 6, the source table 211$t$ and the job table 213$t$ may be a spreadsheet, for example. The source table 211$t$ and the job table 213$t$ may be stored in the memory 23.

The source table driver 211 may load the source table 211$t$ and generate at least one calculated value based on the information using the loaded source table 211$t$. The job table driver 213 may load the job table 213$t$ and generate, using the loaded job table 213*t*, control values respectively corresponding to the at least some motors M1, M2, and M3, based on the at least one calculated value. The data manager 215 may transmit the information to the source table driver 211 and transmit the at least one calculated value to the job table driver 213.

The controller 21 may select the at least some motors M1, M2, and M3 based on the control values generated using the job table 213*t*, and control the positions of the at least some motors M1, M2, and M3 based on the at least one calculated value generated using the source table 211*t*. 'Controlling the positions of the at least some motors M1, M2, M3' may indicate that a position of a rotor of the at least some motors M1, M2, M3 is controlled in a way such that a device connected to the at least some motors M1, M2, M3 is moved from an initial position by the at least one calculated value. Alternatively, 'controlling the positions of the at least some motors M1, M2, M3' may indicate that a position of a rotor of the at least some motors M1, M2, M3 is controlled to be moved by the at least one calculated value such that a device connected to the at least some motors M1, M2, M3 is moved. This will be described in detail with reference to FIGS. 7 and 8.

Figure 2:
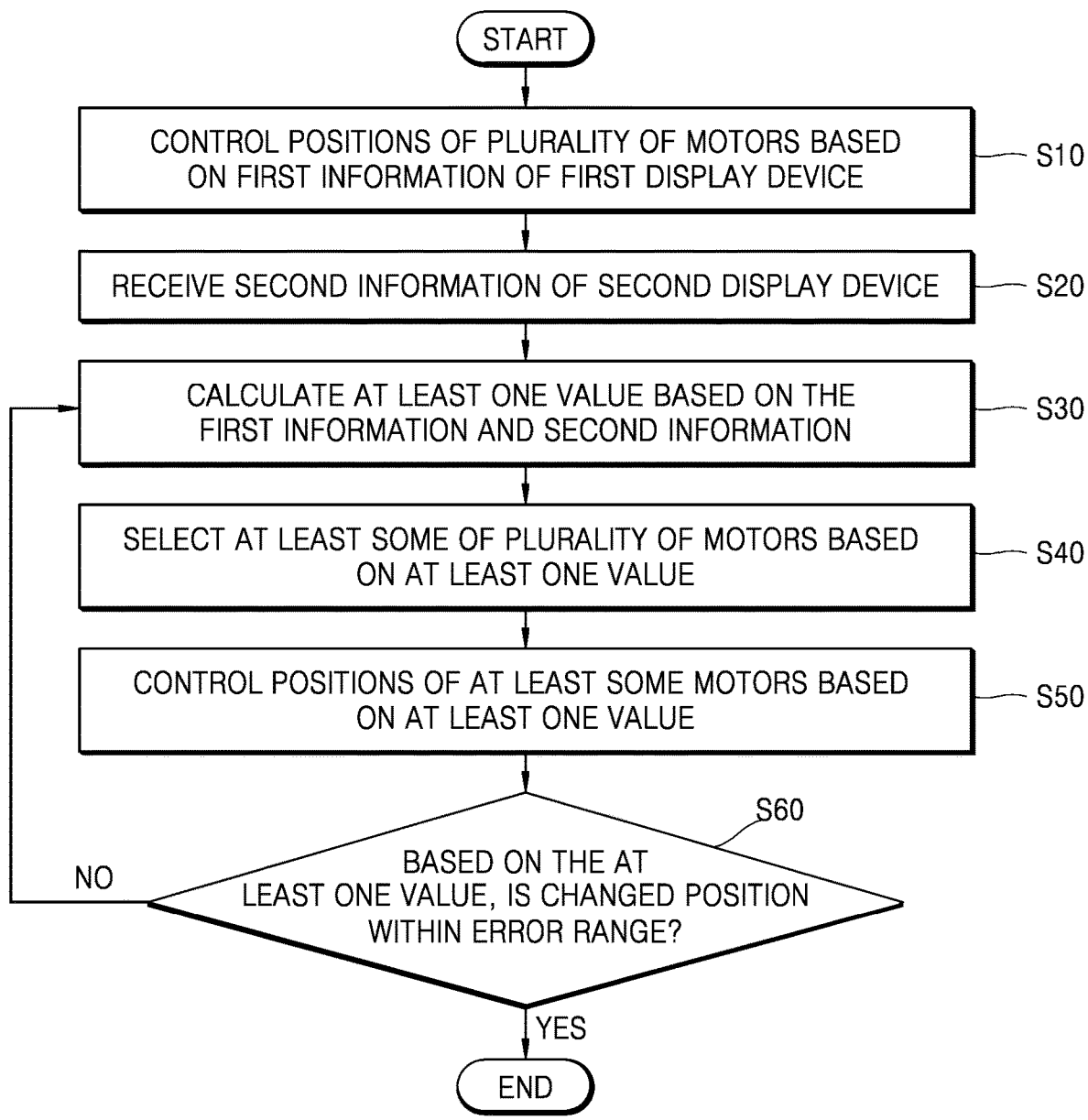
FIG. 2 is a flowchart of a motor position control method according to an embodiment.

FIG. 2 is a flowchart of a motor position control method according to an embodiment. In detail, FIG. 2 is a flowchart of an embodiment of a method of controlling positions of a plurality of motors which are used to sequentially manufacture a first display device DD1 and a second display device DD2 of FIG. 3, as described later.

The motor position control method according to an embodiment may be performed by the controller 21 of FIG. 1. In an alternative embodiment, the motor position control method may be performed by the central server 10 of FIG. 1.

Figure 3:
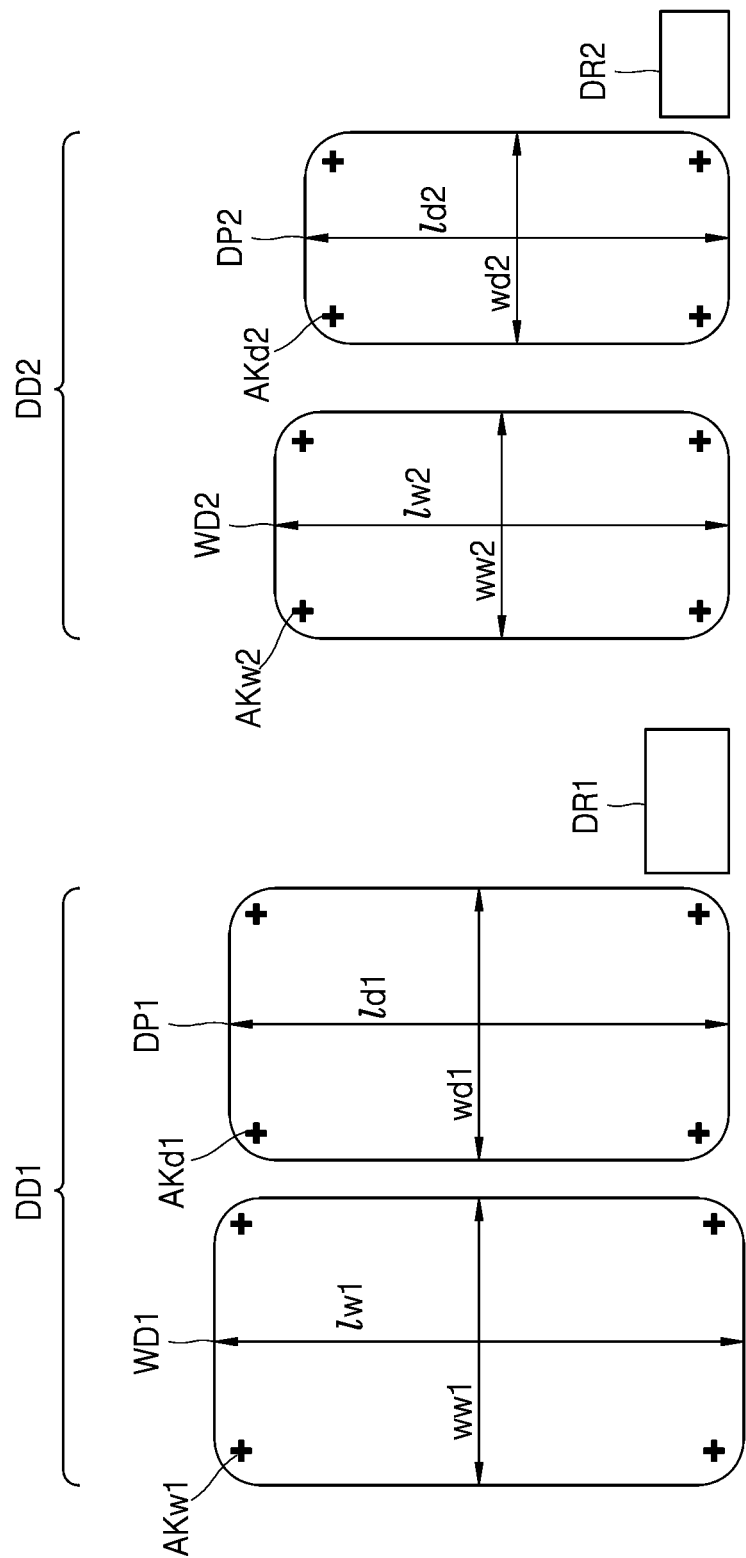
FIG. 3 schematically illustrates information of a central server according to an embodiment.

Referring to FIG. 2, first, positions of a plurality of motors may be controlled based on first information of the first display device DD1 in operation S10. The first information of the first display device DD1 may include information about a first display panel DP1, a first window WD1, and a first driver IC DR1, which constitute the first display device DD1 as illustrated in FIG. 3 to be described later. In an embodiment, for example, the first information of the first display device DD1 may include a length $\ell$ d1 of the first display panel DP1, a width wd1 of the first display panel DP1, a thickness of the first display panel DP1, a position of an alignment mark AKd1 of the first display panel DP1, a length $\ell$ w1 of the first window WD1, a width ww1 of the first window WD1, a thickness of the first window WD1, a position of an alignment mark AKw1 of the first window WD1, and an attachment position of the first driver IC DR1.

After the first display device DD1 is manufactured, second information of the second display device DD2 may be received to manufacture the second display device DD2 in operation S20. The second information of the second display device DD2 may include information about a second display panel DP2, a second window WD2, and a second driver IC DR2, which constitute the second display device DD2 as illustrated in FIG. 3 to be described later. In an embodiment, for example, the second information of the second display device DD2 may include a length $\ell$ d2 of the second display panel DP2, a width wd2 of the second display panel DP2, a thickness of the second display panel DP2, a position of an alignment mark AKd2 of the second display panel DP2, a length $\ell$ w2 of the second window WD2, a width ww2 of the second window WD2, a thickness of the second window WD2, a position of an alignment mark AKw2 of the second window WD2, and an attachment position of the second driver IC DR2.

At least one value may be calculated based on the first information of the first display device DD1 and the second information of the second display device DD2 in operation S30. In an embodiment, for example, as illustrated in FIG. 4 to be described later, at least one value (e.g., a first calculation value (source 01), a second calculation value (source 02), and a third calculation value (source 03) of FIG. 4) may be calculated by inputting the first information and the second information (e.g., #1, #2, #3, #4, and #5 in FIG. 4) to a plurality of cells cl constituting a spreadsheet. Some values (e.g., the second calculation value (source 02) of FIG. 4) may be calculated by inputting, to the plurality of cells cl, the first information and the second information and a calculated value (or a calculation value) (e.g., the first calculation value (source 01) of FIG. 4).

In such an embodiment, the at least one value may be calculated at least one preset formula that uses the first information and the second information as variables (e.g., a first formula (formula 01), a second formula (formula 02), and a third formula (formula 03) of FIG. 4). Some preset formulas (e.g., the second formula (formula 02) of FIG. 4) may use the first information, the second information, and a calculation value as variables. At least one preset formula may be stored in a spreadsheet. The at least one preset formula may include a logical operation and/or an arithmetic operation.

Operation S30 of calculating at least one value based on the first information of the first display device DD1 and the second information of the second display device DD2 may be performed by the source table driver 211 of FIG. 1. The source table driver 211 may generate at least one calculation value based on the first information and the second information using the source table 211*t*. The source table 211*t* may be a spreadsheet that receives the first information and the second information into the plurality of cells cl therein and generates at least one calculation value, as illustrated in FIG. 4 to be described later. At least one preset formula using the first information and the second information as variables may be stored in the source table 211*t*, and at least one calculation value may be calculated according to (or using) at least one preset formula.

At least some motors from among the plurality of motors may be selected based on the at least one value in operation S40.

Figure 5:
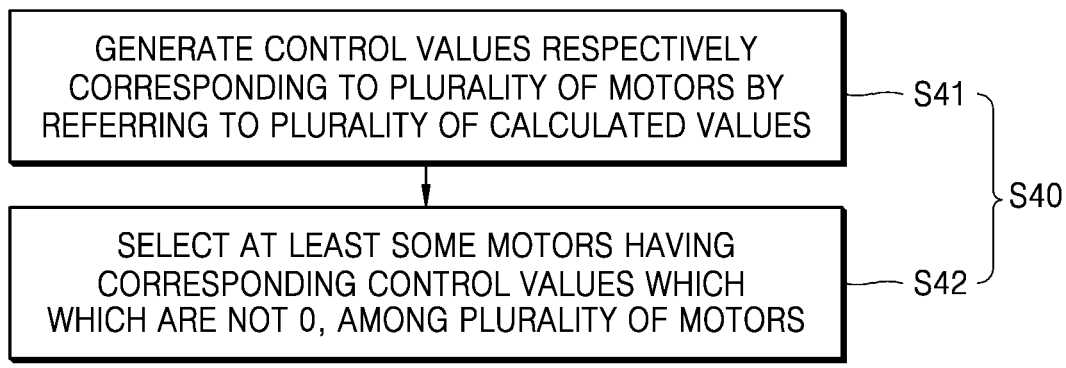
FIG. 5 is a flowchart of a motor position control method according to an embodiment.

In an embodiment, as illustrated in FIG. 5 to be described later, at least one value may be provided in plurality, and operation S40 of selecting at least some motors may include operation S41 of generating control values respectively corresponding to the plurality of motors by referring to the plurality of calculated values and operation S42 of selecting at least some motors having corresponding control values, which are not 0, from among the plurality of motors.

Figure 6:
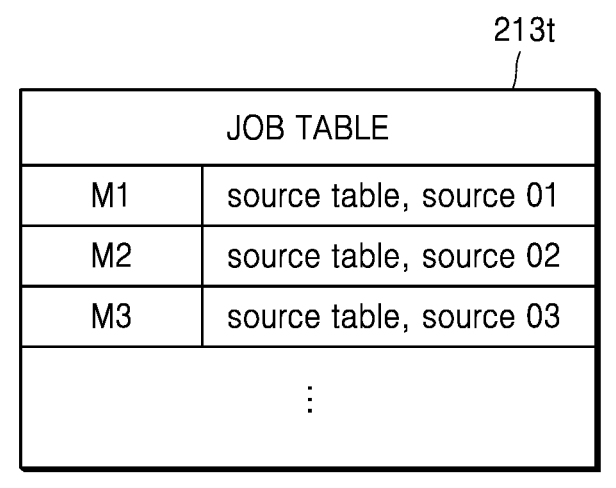

In an embodiment, for example, as illustrated in FIG. 6 to be described later, a control value corresponding to a first motor M1 may be generated by referring to the first calculation value (source 01) of the source table 211*t* of FIG. 4. In such an embodiment, a control value corresponding to a second motor M2 may be generated by referring to the second calculation value (source 02) of the source table 211*t* of FIG. 4. In such an embodiment, a control value corresponding to a third motor M3 may be generated by referring to the third calculation value (source 03) of the source table 211*t* of FIG. 4. Alternatively, the control value corresponding to the second motor M2 may be variously changed; for example, the control value corresponding to the second motor M2 may be generated by referring to the third calculation value (source 03) of the source table 211t of FIG. 4. In an embodiment, as described above, control values may be generated, and at least some motors having a control value that is not 0 may be selected from among the plurality or motors. In an embodiment, for example, when the first calculation value (source 01) is not 0, the first motor M1 is selected.

Operation S41 of generating the control values may be performed by the job table driver 213 of FIG. 1. The job table driver 213 may generate control values respectively corresponding to the plurality of motors using the job table 213t, which refers to the plurality of calculation values calculated from the source table 211t. When the control values are generated, the controller 21 of FIG. 1 may select at least some motors having corresponding control values which are not 0, from among the plurality of motors in operation S42.

Positions of the selected at least some motors may be controlled based on the at least one value in operation S50.

Figure 7:
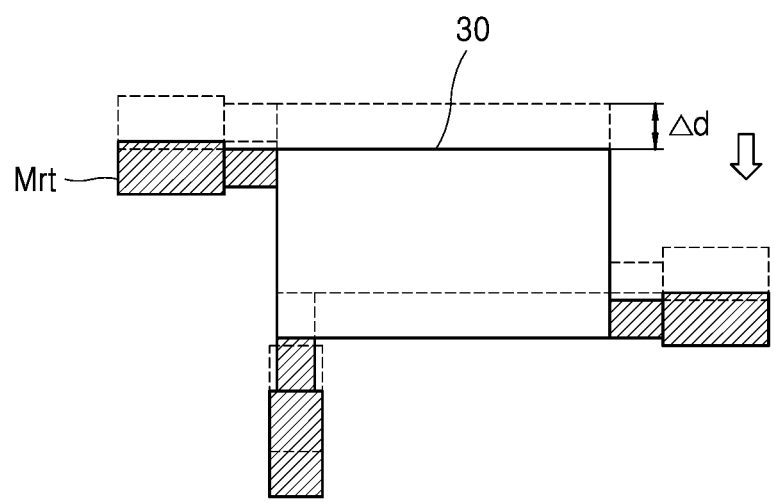
FIG. 7 is a schematic view of a motor position control method according to an embodiment.
Figure 8:
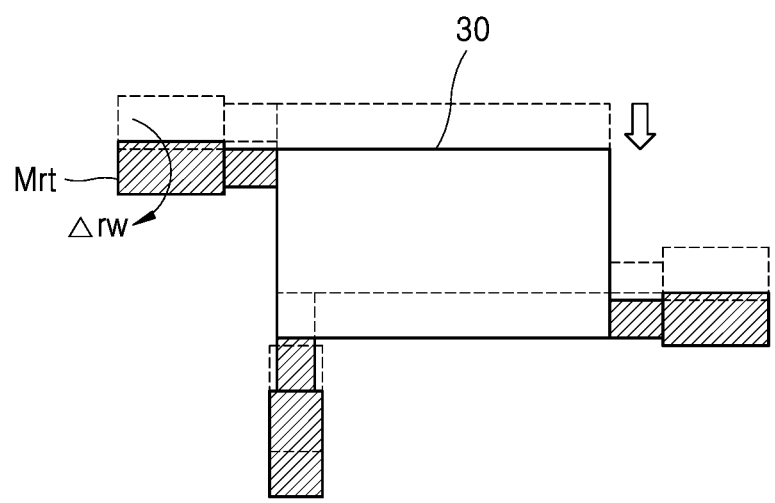
FIG. 8 is a schematic view of a motor position control method according to an embodiment.

In an embodiment, for example, as illustrated in FIG. 7 to be described later, a position of a rotor Mrt of at least some motors may be controlled in a way such that a device 30 connected to the at least some motors is moved from an initial position (based on (or by) the at least one value (or calculation value) (e.g., Δd). Alternatively, as illustrated in FIG. 8 to be described later, the position of the rotor Mrt of the at least some motors may be controlled (to be moved) based on the at least one value (e.g., Δrw) in a way such that the device 30 connected to the at least some motors is moved. The rotor Mrt of the at least some motors may be controlled to rotate counterclockwise or clockwise based on the at least one value (e.g., Δrw).

It may be determined based on the at least one value whether the changed position is within an error range in operation S60. When the changed position is within the error range (YES in FIG. 2), manufacturing of the second display device DD2 may proceed. When the changed position is outside the error range (NO in FIG. 2), the at least one value may be recalculated based on the first information and the second information in operation S30.

Figure 9:
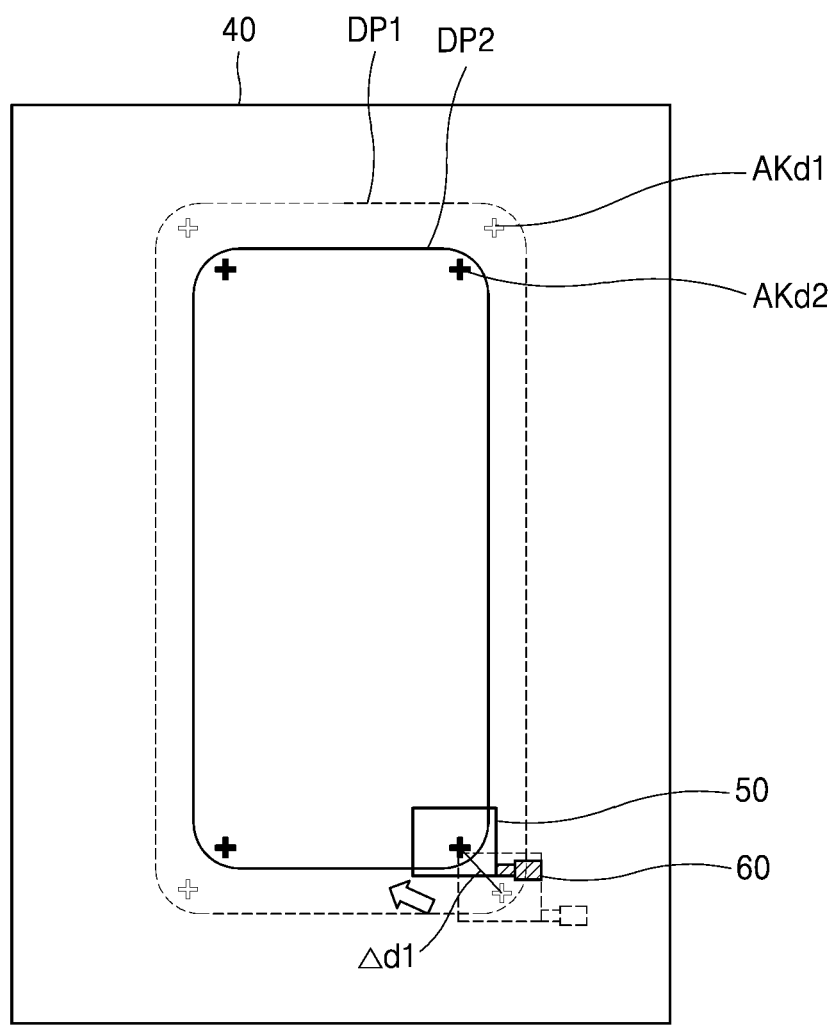
FIG. 9 is a schematic view of a motor position control method according to an embodiment.

In an embodiment, for example, as illustrated in FIG. 9 to be described later, an imaging device 50 connected to a motor may be moved by controlling a position of a rotor 60 of the motor. Whether a position of the alignment mark AKd2 of the second display panel DP2 (or a sample substrate) on a worktable 40, measured using the imaging device 50, is within an error range of a preset alignment position may be determined. The preset alignment position may be a center of a range measured by the imaging device 50. When the position of the alignment mark AKd2 of the second display panel DP2 is within the error range of the preset alignment position, the manufacturing of the second display panel DP2 may proceed. When the position of the alignment mark AKd2 of the second display panel DP2 is outside the error range of the preset alignment position, the at least one value may be recalculated based on the first information and the second information in operation S30.

Figure 10:
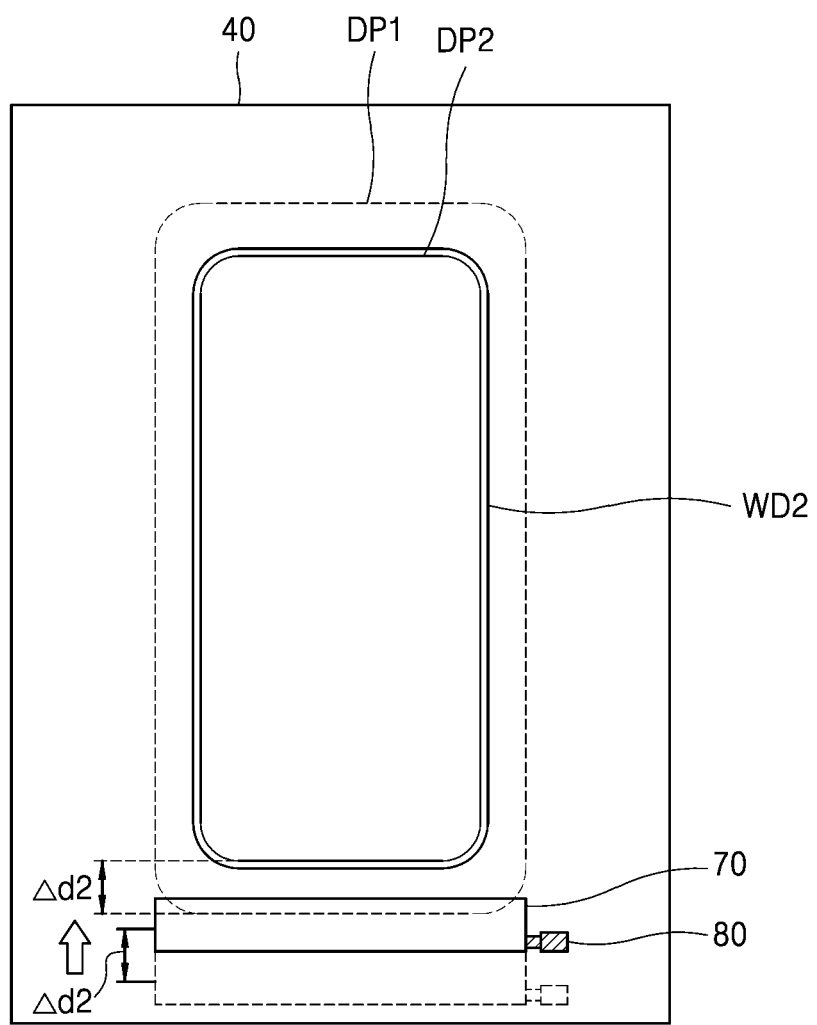
FIG. 10 is a schematic view of a motor position control method according to an embodiment.
Figure 11:
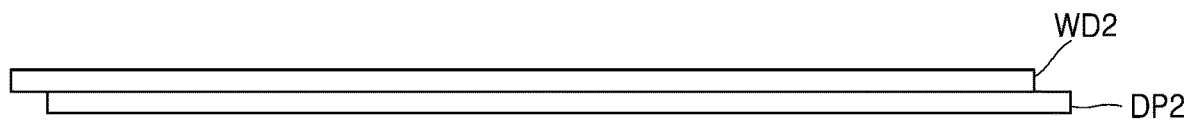
FIG. 11 is a schematic view of a motor position control method according to an embodiment.

Alternatively, as illustrated in FIG. 10 to be described later, by controlling a position of a rotor 80 of a motor, a roller 70 connected to the motor may be moved. Whether a position of the second window WD2 (or a sample window) attached to the second display panel DP2 (or a sample substrate) on the worktable 40 using the roller 70 is within an error range of a preset attachment position may be determined. The preset attachment position may be a position where a center of the second display panel DP2 corresponds to a center of the second window WD2. When the position of the second window WD2 is outside the error range of the preset attachment position, the at least one value may be recalculated based on the first information and the second information in operation S30. In an embodiment, for example, as illustrated in FIG. 11, as described later, when the center of the second window WD2 is misaligned with the center of the second display panel DP2, this may indicate that the position of the second window WD2 may be outside the error range of the preset attachment position, and the at least one value may be recalculated based on the first information and the second information in operation S30.

In an embodiment, as described above, by receiving information of each of the display devices, calculating at least one value (or amount of change) based on the information, and controlling a position of a motor based on the at least one calculated value, to sequentially manufacture display devices of different sizes, the setting time of equipment for manufacturing the display devices may be reduced.

FIG. 3 schematically illustrates information of a central server according to an embodiment.

Referring to FIG. 3, the information storage 100 (refer to FIG. 1) of the central server 10 (refer to FIG. 1) may include the first information of the first display device DD1 and the second information of the second display device DD2.

The first information of the first display device DD1 may include information about the first display panel DP1, the first window WD1, and the first driver IC DR1, which constitute the first display device DD1. In an embodiment, for example, the first information of the first display device DD1 may include the length ℓd1 of the first display panel DP1, the width wd1 of the first display panel DP1, the thickness of the first display panel DP1, the position of the alignment mark AKd1 of the first display panel DP1, the length ℓw1 of the first window WD1, the width ww1 of the first window WD1, the thickness of the first window WD1, the position of the alignment mark AKw1 of the first window WD1, and the attachment position of the first driver IC DR1.

FIG. 3 illustrates that the first display device DD1 includes the first display panel DP1, the first window WD1, and the first driver IC DR1, but the disclosure is limited thereto. In an alternative embodiment, the first display device DD1 may further include a touch panel, an optical function layer, a protective film, a battery, a printed circuit board, or the like.

The second information of the second display device DD2 may include information about the second display panel DP2, the second window WD2, and the second driver IC DR2, which constitute the second display device DD2. In an embodiment, for example, the second information of the second display device DD2 may include the length ℓd2 of the second display panel DP2, the width wd2 of the second display panel DP2, the thickness of the second display panel DP2, the position of the alignment mark AKd2 of the second display panel DP2, the length ℓw2 of the second window WD2, the width ww2 of the second window WD2, the thickness of the second window WD2, the position of the alignment mark AKw2 of the second window WD2, and the attachment position of the second driver IC DR2.

FIG. 3 illustrates that the second display device DD2 includes the second display panel DP2, the second window WD2, and the second driver IC DR2, but the disclosure is limited thereto. In an alternative embodiment, the second display device DD2 may further include a touch panel, an optical function layer, a protective film, a battery, a printed circuit board, or the like.

FIG. 4 schematically illustrates a source table according to an embodiment.

Referring to FIG. 4, the source table 211t may be a spreadsheet, which receives the first information and the second information (e.g., #1, #2, #3, #4, #5) in the plurality of cells cl as an input and generates at least one calculation value (e.g., the first calculation value (source 01), the second calculation value (source 02), and the third calculation value (source 03)). The source table 211t may store at least one preset formula that uses the first information and the second information as variables (e.g., the first formula (formula 01), the second formula (formula 02), the third formula (formula 03)), and at least one calculation value may be calculated according to the at least one preset formula. The at least one preset formula may include a logical operation and/or an arithmetic operation.

In an embodiment, for example, as illustrated in FIG. 4, the first formula (formula 01) may use #1 and #2 as variables, and the first calculation value (source 01) may be generated according to the first formula (formula 01). In such an embodiment, the second formula (formula 02) may use the first calculation value (source 01), #3, and #4 as variables, and the second calculation value (source 02) may be generated according to the second formula (formula 02). In such an embodiment, the third formula (formula 03) may use the first calculation value (source 01), the second calculation value (source 02), and #5 as variables, and the third calculation value (source 03) may be generated according to the third formula (formula 03).

Although not illustrated in FIG. 4, the source table 211t may include an identification (ID), numbers, names, controller numbers, value storage, arithmetic operation symbols, data size (16 bit or 32 bit), decimal point positions, or the like. The arithmetic operation may be performed while the value storage, the arithmetic operation symbols, the data size, or the decimal point positions are repeatedly described.

FIG. 5 is a flowchart of a motor position control method according to an embodiment, and FIG. 6 is a schematic view of a job table according to an embodiment.

Referring to FIG. 5, operation S40 of selecting at least some motors may include operation S41 of generating control values respectively corresponding to the plurality of motors by referring to the plurality of calculated values and operation S42 of selecting at least some motors having corresponding control values which are not 0, from among the plurality of motors.

In an embodiment, for example, as illustrated in FIG. 6, a control value corresponding to the first motor M1 may be generated by referring to the first calculation value (source 01) of the source table 211t of FIG. 4. In such an embodiment, a control value corresponding to the second motor M2 may be generated by referring to the second calculation value (source 02) of the source table 211t of FIG. 4. In such an embodiment, a control value corresponding to the third motor M3 may be generated by referring to the third calculation value (source 03) of the source table 211t of FIG. 4. Alternatively, the control value corresponding to the second motor M2 may be variously changed; for example, the control value corresponding to the second motor M2 may be generated by referring to the third calculation value (source 03) of the source table 211t of FIG. 4. As described above, control values may be generated, and at least some motors having a control value that is not 0 may be selected from among the plurality or motors. In an embodiment, for example, when the first calculation value (source 01) is not 0, the first motor M1 is selected.

Operation S41 of generating the control values may be performed by the job table driver 213 of FIG. 1. The job table driver 213 may generate control values respectively corresponding to the plurality of motors using the job table 213t, which refers to the plurality of calculation values calculated from the source table 211t. When the control values are generated, the controller 21 of FIG. 1 may select at least some motors having corresponding control values which are not 0 from among the plurality of motors.

In such an embodiment, as described above, the job table 213t may include ID, numbers, names, line numbers (ID) of the source table 211t, control device numbers, value storage, data size (16 bit or 32 bit), decimal point positions, motor position value addresses, or the like.

FIG. 7 is a schematic view of a motor position control method according to an embodiment.

Referring to FIG. 7, the position of the rotor Mrt of at least some motors may be controlled in a way such that the device 30 connected to a motor is moved from the initial position by at least one value (or a calculation value) (e.g., Δd). The rotor Mrt of the motor may be rotated counterclockwise or clockwise so that the device 30 connected to the motor is moved by Δd from the initial position.

FIG. 8 is a schematic view of a motor position control method according to an embodiment.

Referring to FIG. 8, the position of the rotor Mrt of at least some motors may be controlled by at least one value (e.g., Δrw) in a way such that the device 30 connected to a motor is moved. The rotor Mrt of the at least some motors may be controlled to rotate counterclockwise or clockwise by at least one value (e.g., Δrw).

FIG. 9 is a schematic view of a motor position control method according to an embodiment.

Referring to FIG. 9, a calculation value Δd1 may be generated based on the position of the alignment mark AKd1 of the first display panel DP1 and the position of the alignment mark AKd2 of the second display panel DP2. The calculation value Δd1 may be a difference between the position of the alignment mark AKd1 of the first display panel DP1 and the position of the alignment mark AKd2 of the second display panel DP2.

A motor connected to the imaging device 50 may be selected based on the calculation value Δd1, and the position of the rotor 60 of the motor may be controlled in a way such that the imaging device 50 is moved. In an embodiment, for example, the position of the rotor 60 of the motor may be controlled such that the imaging device 50 is moved from the initial position by the calculation value Δd1.

Whether the position of the alignment mark AKd2 of the second display panel DP2 (or a sample substrate) on the worktable 40, which is measured using the imaging device 50, is within an error range of a preset alignment position may be determined. The preset alignment position may be a center of a range measured by the imaging device 50. When the position of the alignment mark AKd2 of the second display panel DP2 is within the error range of the preset alignment position, the manufacturing of the second display panel DP2 may proceed. When the position of the alignment mark AKd2 of the second display panel DP2 is outside the error range of the present alignment position, at least one value may be recalculated based on the position of the alignment mark AKd1 of the first display panel DP1 and the position of the alignment mark AKd2 of the second display panel DP2.

FIGS. 10 and 11 are schematic views of a motor position control method according to an embodiment.

First, referring to FIG. 10, a calculation value Δd2 may be generated based on the size of the first display panel DP1 and the size of the second display panel DP2. The calculation value Δd2 may be a difference between a position of one edge of the first display panel DP1 and a position of one edge, (which corresponds to the one edge of the first display panel DP1), of the second display panel DP2.

A motor connected to the roller 70 may be selected based on the calculation value Δd2, and the position of the rotor 80 of the motor may be controlled such that the roller 70 is moved. In an embodiment, for example, the position of the rotor 80 of the motor may be controlled such that the roller 70 is moved from the initial position by the calculation value Δd2.

Whether the position of the second window WD2 (or a sample window) attached to the second display panel DP2 (or a sample substrate) on the worktable 40 using the roller 70 is within an error range of a preset attachment position may be determined. The preset attachment position may be a position where a center of the second display panel DP2 corresponds to a center of the second window WD2. When the position of the second window WD2 is outside the error range of the preset attachment position, at least one value may be recalculated based on the size of the first display panel DP1 and the size of the second display panel DP2. In an embodiment, for example, as illustrated in FIG. 11, when the center of the second window WD2 is misaligned with the center of the second display panel DP2, this may indicate that the position of the second window WD2 may be outside the error range of the preset attachment position, and at least one value may be recalculated based on the size of the first display panel DP1 and the size of the second display panel DP2.

According to the embodiments of the invention, as described above, e a motor position control system and a motor position control method may reduce the setting time of equipment for manufacturing a display device. However, the scope of the disclosure is not limited by the above-described effects.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A motor position control system for a plurality of motors used to sequentially manufacture a first display device and a second display device, the motor position control system comprising:
    a central server including first information of the first display device and second information of the second display device; and
    a motor position control device which controls positions of the plurality of motors,
    wherein the motor position control device comprises:
        a memory; and
        a controller which receives the first information and the second information from the central server and store the first information and the second information in the memory, controls the positions of the plurality of motors based on the first information, calculates at least one value based on the first information and the second information, selects at least some motors from among the plurality of motors based on the at least one value, and controls positions of the at least some motors based on the at least one value.

2. The motor position control system of claim 1, wherein the controller comprises:
    a source table driver which generates at least one calculation value based on the first information and the second information using a source table;
    a job table driver which generates control values respectively corresponding to the at least some motors based on the at least one calculation value using a job table; and
    a data manager which transmits the first information and the second information to the source table driver, and transmits the at least one calculation value to the job table driver.

3. The motor position control system of claim 2, wherein the source table comprises a spreadsheet which receives, in a plurality of cells therein, the first information and the second information as an input and generates the at least one calculation value.

4. The motor position control system of claim 2, wherein
    the source table stores at least one preset formula which uses the first information and the second information as variables, and
    the at least one calculation value is calculated based on the at least one preset formula.

5. The motor position control system of claim 2, wherein
    the at least one calculation value is in plurality, and
    the job table driver generates control values respectively corresponding to the plurality of motors using the job table which refers to a plurality of calculation values calculated from the source table, and
    the controller selects the at least some motors having a corresponding control value which is not 0 from among the plurality of motors.

6. The motor position control system of claim 1, wherein the controller controls a position of a rotor of the at least some motors in a way such that a device connected to the at least some motors is moved from an initial position based on the at least one value.

7. The motor position control system of claim 1, wherein the controller controls a position of a rotor of the at least some motors based on the at least one value in a way such that a device connected to the at least some motors is moved.

8. The motor position control system of claim 1, wherein the controller determines whether a position of an alignment mark of a sample substrate on a worktable, which is measured using an imaging device connected to the at least some motors, is within an error range of a preset alignment position, and recalculates, when the position of the alignment mark of the sample substrate is outside the error range of the preset alignment position, at least one value based on the first information and the second information.

9. The motor position control system of claim 1, wherein the controller determines whether a position of a sample window attached to a sample substrate on a worktable, using a roller connected to the at least some motors, is within an error range of a preset attachment position, and recalculates, when the position of the sample window is outside the error range of the preset attachment position, at least one value based on the first information and the second information.

10. The motor position control system of claim 1, wherein
the first information comprises information about a first display panel, a first window, and a first driver integrated circuit, which constitute the first display device, and the second information comprises information about a second display panel, a second window, and a second driver integrated circuit, which constitute the second display device.

11. A motor position control method for a plurality of motors used to sequentially manufacture a first display device and a second display device, the motor position control method comprising:

controlling positions of the plurality of motors based on first information of the first display device;

receiving second information of the second display device;

calculating at least one value based on the first information and the second information;

selecting at least some motors from among the plurality of motors based on the at least one value; and controlling positions of the at least some motors based on the at least one value.

12. The motor position control method of claim 11, wherein the calculating the at least one value comprises calculating the at least one value by inputting the first information and the second information into a plurality of cells constituting a spreadsheet.

13. The motor position control method of claim 11, wherein the calculating the at least one value comprises calculating the at least one value based on at least one preset formula which uses the first information and the second information as variables.

14. The motor position control method of claim 13, wherein the at least one preset formula is stored in a spreadsheet.

15. The motor position control method of claim 11, wherein the at least one value is in plurality, and the selecting the at least some motors comprises:

generating control values respectively corresponding to the plurality of motors by referring to a plurality of calculated values; and selecting the at least some motors having a corresponding control value which is not 0 from among the plurality of motors.

16. The motor position control method of claim 11, wherein the controlling the positions of the at least some motors comprises controlling a position of a rotor of the at least some motors in a way such that a device connected to the at least some motors is moved from an initial position based on the at least one value.

17. The motor position control method of claim 11, wherein the controlling the positions of the at least some motors comprises controlling a position of a rotor of the at least some motors based on the at least one value in a way such that a device connected to the at least some motors is moved.

18. The motor position control method of claim 11, further comprising:

determining whether a position of an alignment mark of a sample substrate on a worktable, which is measured using an imaging device connected to the at least some motors, is within an error range of a preset alignment position; and recalculating at least one value based on the first information and the second information when the position of the alignment mark of the sample substrate is outside the error range of the preset alignment position.

19. The motor position control method of claim 11, further comprising:

determining whether a position of a sample window attached to a sample substrate on a worktable, using a roller connected to the at least some motors, is within an error range of a preset attachment position; and recalculating at least one value based on the first information and the second information when the position of the sample window is outside the error range of the preset attachment position.

20. The motor position control method of claim 11, wherein the first information comprises information about a first display panel, a first window, and a first driver integrated circuit, which constitute the first display device, and the second information comprises information about a second display panel, a second window, and a second driver integrated circuit, which constitute the second display device.

\* \* \* \* \*